United States Patent [19]
Jocher

[11] Patent Number: 6,091,971
[45] Date of Patent: Jul. 18, 2000

[54] PLUMBING WIRELESS PHONES AND APPARATUS THEREOF

[75] Inventor: Ronald William Jocher, East Hanover, N.J.

[73] Assignee: Lucent Technologies Inc., Murray Hill, N.J.

[21] Appl. No.: 08/914,132

[22] Filed: Aug. 18, 1997

[51] Int. Cl.[7] .................................................. H04Q 7/20
[52] U.S. Cl. ............................................ 455/575; 455/90
[58] Field of Search .................................. 455/15, 19, 25, 455/82, 83, 90, 107, 127, 128, 129, 424, 425, 523, 550, 562, 575, 117; 343/702, 714; 439/63, 581, 916, 578, 583

[56] References Cited

U.S. PATENT DOCUMENTS

| | | | |
|---|---|---|---|
| 4,125,308 | 11/1978 | Schilling | 439/63 |
| 4,456,411 | 6/1984 | Clement | 408/230 |
| 4,669,805 | 6/1987 | Kosugi et al. | 439/581 |
| 4,759,667 | 7/1988 | Brown | 408/230 |
| 4,795,352 | 1/1989 | Capp et al. | 439/63 |
| 4,811,426 | 3/1989 | Pergande | 455/327 |
| 5,335,366 | 8/1994 | Daniels | 455/128 |
| 5,338,896 | 8/1994 | Danforth | 455/128 |
| 5,444,866 | 8/1995 | Cykiert | 455/128 |
| 5,577,268 | 11/1996 | Ho et al. | 455/90 |
| 5,577,269 | 11/1996 | Ludevig | 455/575 |
| 5,734,350 | 3/1998 | Denning et al. | 343/702 |
| 5,777,586 | 7/1998 | Luxon et al. | 455/90 |
| 5,787,340 | 7/1998 | Sepponen | 455/128 |
| 5,835,064 | 10/1998 | Gomez et al. | 343/702 |
| 5,854,970 | 12/1998 | Kivela | 455/90 |
| 5,936,582 | 8/1999 | Wallace et al. | 343/702 |

*Primary Examiner*—William G. Trost
*Assistant Examiner*—Jean A. Gelin

[57] ABSTRACT

A cost effective and convenient system for converting a wireless phone that radiates stray RF energy outside of the intended RF transmission path into a wireless phone that confines the RF energy to a shielded RF transmission path. This system will be referred to as "plumbing" a phone. In the plumbing system, a shielded RF adapter contacts the RF output from the printed circuit board (the RF clip in certain embodiments) of the wireless phone. In certain embodiments where the wireless phone is prepared for various tests and/or performance measurements, the plumbing process involves a shielded RF adapter and/or some of the following steps: removing the supplied antenna from the wireless phone, modifying the antenna base if necessary to accommodate the shielded RF adapter, applying a conductive coating on the inside of the phone case to increase RF shielding and installing the shielded RF adapter into the antenna base such that the RF clip of the phone directly contacts an extended center pin of the shielded RF adapter. The shielded RF adapter and the plumbing system provide a shielded RF transmission path having a higher integrity in terms of mechanical strength and electrical performance than previous systems. Additionally, the plumbing system does not require any permanent modification of the printed circuit board of the wireless phone and does not require the use of an expensive shielded box in performing optimization tests. Thus, the plumbing system according to the principles of the present invention reduces the time, costs and resources for providing a wireless phone that confines its RF energy to a shielded RF transmission path.

11 Claims, 3 Drawing Sheets

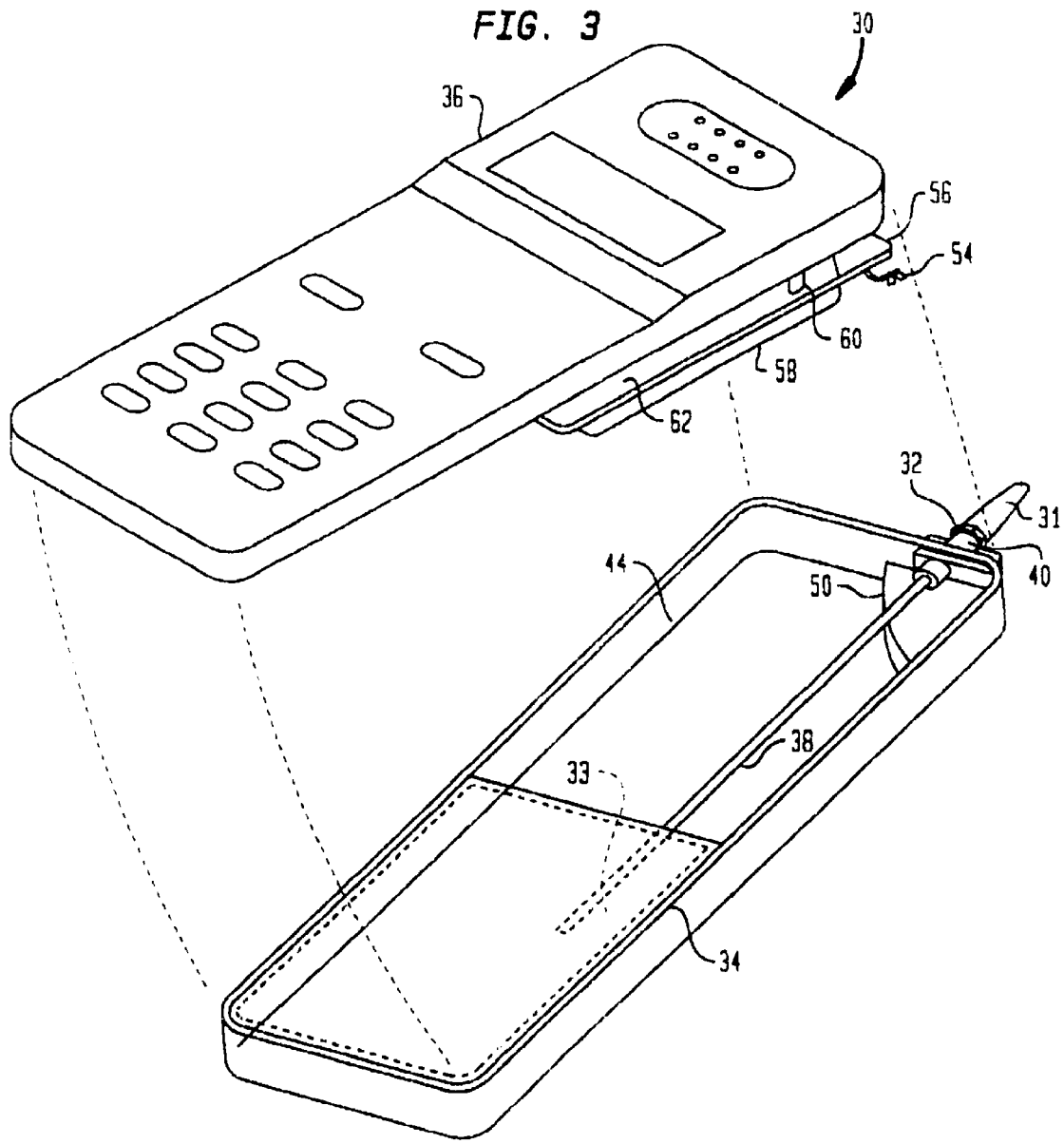

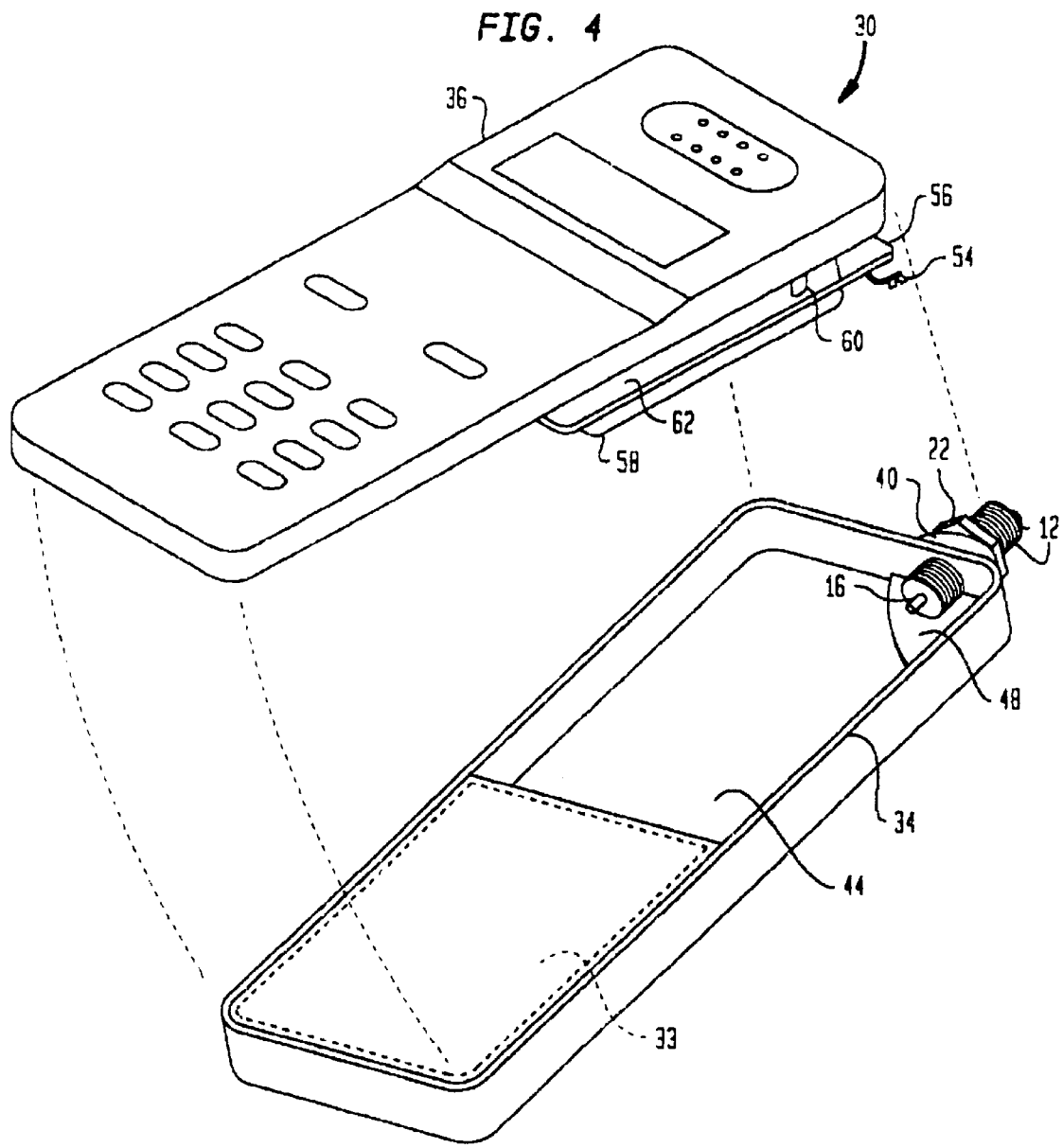

PLUMBING WIRELESS PHONES AND APPARATUS THEREOF

BACKGROUND OF THE INVENTION

1. Field of the Invention

The present invention relates to wireless phones in general and, more particularly, to a method of plumbing wireless phones and the resulting phones thereof.

2. Description of the Related Art

Current wireless phone designs have a radio frequency (RF) clip that carries the RF output from the printed circuit board of the phone. The RF clip contacts the base of the antenna assembly, and RF energy radiates from the entire antenna assembly. Some wireless phones provide shielded transmission paths to the antenna, but the typical design for a wireless phone permits stray RF energy to radiate into free space through unshielded portions of the phone case, especially through a typically unshielded portion of the phone case adjacent to where the RF clip contacts the antenna base. Although this stray RF energy is acceptable for the purposes of the end user, for certain tests and measurements, such as wireless lab measurements, phone characterization data, cell-site optimization measurements, and phone performance verification, the total RF energy produced from the phone transmitter should be confined to the intended transmission path.

FIG. 1 shows a wireless phone 2 which has been modified for the purpose of providing a shielded transmission path to perform various measurements and tests. The phone 2 uses a slip-fit, SMB-type coaxial connector 3 which screws into the antenna base 4. The inside end 6 of the SMB connector 3 is joined to a miniature coax cable 7 that is terminated onto a printed circuit board 8 of the phone 2. The printed circuit board 8 is permanently modified by the installation of the miniature coaxial cable 7. The outside end 9 of the SMB coaxial connector 3 slip fits with a mating coaxial cable assembly (not shown) for performing the various tests and/or performance measurements.

During the modification process, the supplied phone antenna assembly (not shown) is removed and replaced with the SMB connector 3. The RF clip (not shown) is also removed from the printed circuit board 8 of the phone 2, and the miniature coaxial cable 7 is permanently attached to the printed circuit board 8 where the RF clip had been. By removing the RF clip, a discontinuity in the designed characteristics of the transmission path is created. The miniature coaxial cable 7 also causes a discontinuity (impedance mismatches) in the transmission path of the phone 2 because the miniature coaxial cable 7 tends to become folded over and pinched at the fold over site 5. Additionally, the slip-fit SMB connector 3 is mechanically weak and tends to break from phone usage, thereby requiring that the permanently modified phone 2 be thrown away. As such, this process is rather timely, costly, resource dependent and permanently modifies the printed circuit board 8 of the phone 2.

In performing cell-site optimization tests with the SMB-modified phones 2, an expensive shielded box (not shown) has been required to ensure there is no stray RF energy emitting from the phone case 10, especially through a typically unshielded portion 11 of the phone case 10 around where the miniature coaxial cable 7 is connected to the SMB connector 3. The expensive shielded box (not shown) is required because the typical SMB-modified phone 2 still radiates through the case 10, and the miniature coaxial cable 7 is lossy because it radiates RF energy through its braided shield. To perform the cell-site optimization tests, the SMB-modified phone 2 is held by a cradle (not shown) in the shielded box (not shown), and DC power is supplied to the phone 2 through a filtered DC power connection (not shown). The DC power supply and line (not shown) require shielding to protect the integrity of the shielded box (not shown). One end of the small coaxial cable (not shown) is connected to the outside end 9 of the SMB connector 3, and the other end of the small coaxial cable (not shown) is connected to one end of a SMA-type RF bulkhead connector (not shown). The RF bulkhead connector (not shown) passes through the metal wall of the shielded box (not shown), and the other end of the RF bulkhead connector is joined to another coaxial cable (not shown) leading to an antenna (not shown) mounted on a vehicle (not shown) which is driven around to perform the cell-site optimization tests. The use of the expensive shielded box (not shown) is not only costly but cumbersome and time consuming as well. For example, the phone 2 has to be mounted within the shielded box (not shown), and the shielded box (not shown) must be carried to and from the vehicle in which the tests are typically performed. Additionally, the phone 2 is inaccessible while it is in the shielded box (not shown).

Accordingly, a need exists for an enhanced and cost effective system for converting wireless phones that radiate stray RF energy into wireless phones which confine the RF energy to the shielded transmission path.

SUMMARY OF THE INVENTION

The present invention involves a cost effective and convenient system for converting a wireless phone that radiates stray RF energy outside of the intended RF transmission path into a wireless phone that confines the RF energy to a shielded RF transmission path. This system will be referred to as "plumbing" a phone. In the plumbing system, a shielded RF adapter contacts the RF output from the printed circuit board (the RF clip in certain embodiments) of the wireless phone. In certain embodiments where the wireless phone is prepared for various tests and/or performance measurements, the plumbing process involves a shielded RF adapter and/or some of the following steps: removing the supplied antenna from the wireless phone, modifying the antenna base if necessary to accommodate the shielded RF adapter, applying a conductive coating on the inside of the phone case to increase RF shielding and installing the shielded RF adapter into the antenna base such that the RF clip of the phone directly contacts an extended center pin of the shielded RF adapter. The shielded RF adapter and the plumbing system provide a shielded RF transmission path having a higher integrity in terms of mechanical strength and electrical performance than previous systems. Additionally, the plumbing system does not require any permanent modification of the printed circuit board of the wireless phone and does not require the use of an expensive shielded box in performing optimization tests. Thus, the plumbing system according to the principles of the present invention reduces the time, costs and resources for providing a wireless phone that confines its RF energy to a shielded RF transmission path.

BRIEF DESCRIPTION OF THE DRAWING

Other aspects and advantages of the present invention may become apparent upon reading the following detailed description and upon reference to the drawings in which:

FIG. 3 shows a partially exploded perspective view of a wireless phone with a transmission path having an incomplete case shielding with antenna which can use the plumbing system according to the principles of the present invention to provide an enhanced shielded transmission path for the wireless phone; and FIG. 4 shows a partially exploded perspective view of the wireless phone of FIG. 2 after being modified using the plumbing system according to the principles of the present invention.

DETAILED DESCRIPTION

Figure 1:
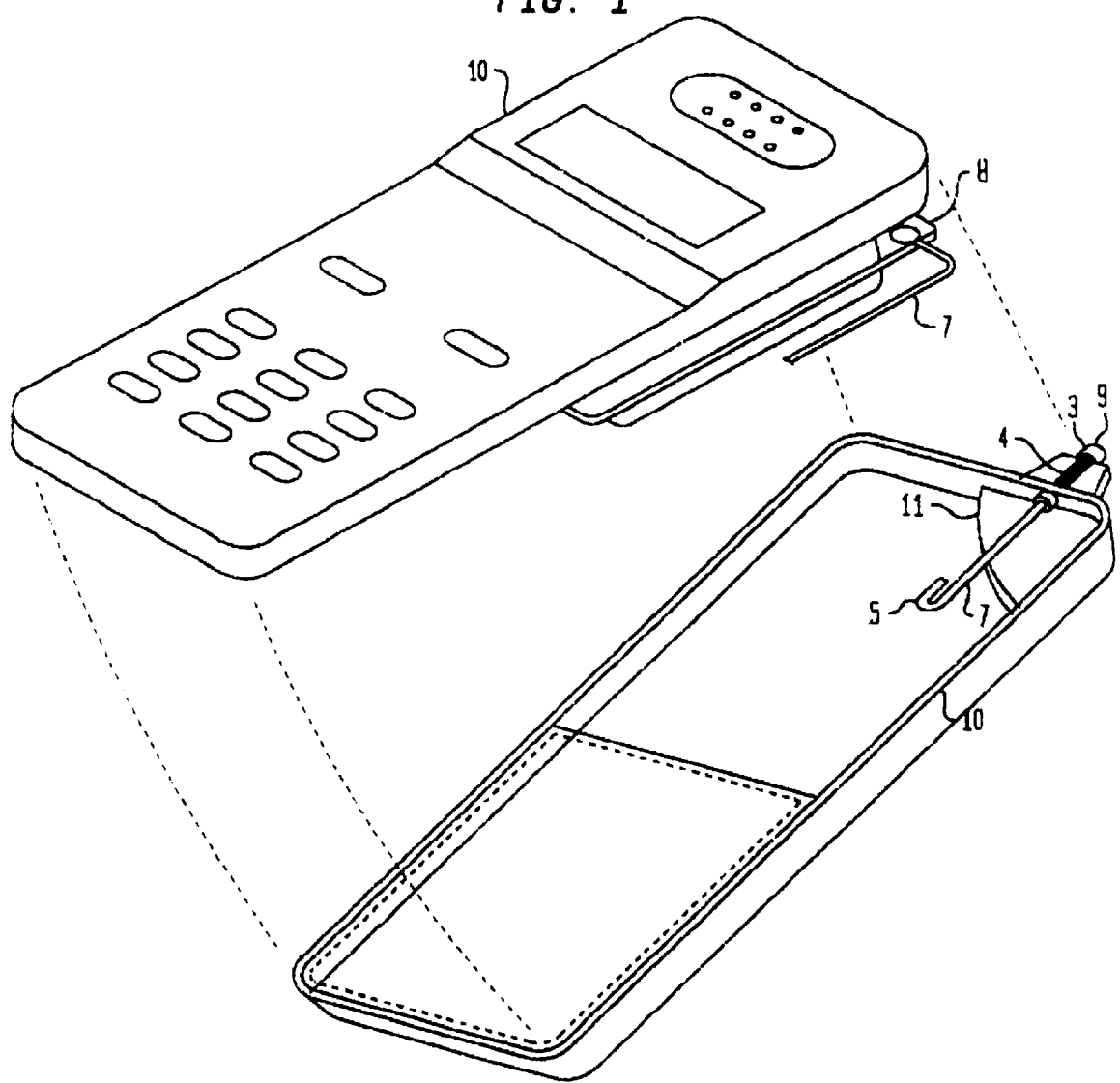
FIG. 1 shows a partially exploded perspective view of a wireless phone modified by a prior art system for confining the RF energy of the wireless phone to the intended RF transmission path.

An illustrative embodiment of the plumbing system for wireless phones according to the principles of the present invention is described below as the plumbing system might be implemented to reduce the time, costs and resources associated with previous systems to provide wireless phones in which RF energy is directed through a shielded RF transmission path. In accomplishing this, the plumbing system involves a shielded RF adapter that contacts the RF output from the phone printed circuit board and eliminates the problems associated with the miniature coaxial cable of the prior systems. Depending on the particular design of the wireless phone, certain embodiments of the plumbing system can include the following steps: removing the supplied antenna from the wireless phone, modifying the antenna base if necessary to accommodate the shielded RF adapter, such as a modified RF bulkhead coaxial connector, applying a conductive coating on the inside of the phone case to increase RF shielding and installing the shielded RF adapter into the antenna base such that the shielded RF adapter directly contacts the RF clip of the phone. Thus, the plumbing process according to certain aspects of the present invention does not require the permanent modification of the printed circuit board, thereby permitting the re-installation of the supplied phone antenna or the installation of another antenna on the shielded RF adapter. Additionally, the wireless phones modified according to the enhanced plumbing system do not require the expensive shielded box to perform optimization tests. As such, the plumbing system reduces the costs and resources associated with the previous modification systems and provides wireless phones which are more convenient and perform better in various tests and measurements.

The plumbing system involves converting wireless phones that radiate RF energy outside the intended transmission path to devices that confine the radiated RF energy to shielded transmission paths. Certain embodiments of the plumbing system use a threaded, SMA-type RF coaxial adapter to replace the slip-fit, SMB connector 3 (FIG. 1) as the shielded RF adapter to provide a more robust connector for the antenna in terms of mechanical strength and electrical performance. FIG. 2 shows a shielded, SMA-type RF adapter 12 for use in the plumbing process to provide wireless phones which confine the RF energy to a shielded transmission path. In certain embodiments, the shielded RF adapter 12 can be a modified SMA-type bulkhead coaxial connector with a shortened body length having a outer conductor 13 along the length of the adapter 12. The shielded RF adapter 12 provides a 50 ohm characteristic impedance transmission path to match the transmission lines typically used.

In this particular embodiment, the shielded RF adapter 12 is specifically designed as a shielded RF coaxial adapter for use in the plumbing system according to certain principles of the present invention, but as mention above, a modified SMA-type bulkhead connector can be used. In the shielded RF adapter 12, the outer conductor 13 surrounds a center conductor 14, thereby shielding the center conductor 14. The center conductor 14 is extended beyond the outer conductor 13 with an extended portion 16 which directly contacts the RF clip (not shown) of the wireless phone (not shown) being plumbed as will be discussed below. In this particular embodiment, the center conductor 14 is a single extended center conductor 14 with the contact extension 16, but the contact extension 16 can be a separate contact extension connected to the center conductor 14 in other embodiments. The adapter 12 includes SMA-type threads 18 at one end of the adapter 12 for screwing into the antenna base (not shown) of the wireless phone (not shown) and SMA-type threads 20 at the other end of the adapter 12 for connecting to test and/or measurement equipment (not shown) or an antenna (not shown). FIG. 2 shows the dimensions for the shielded RF adapter 12 of this particular embodiment. Additionally, the adapter 12 includes a collar 22 in the form of a hexagonal jam nut for tightening and removing the adapter 12 from the phone antenna base (not shown).

Plumbing systems according to the principles of the present invention will typically involve the use of an embodiment of the shielded RF adapter 12 according to at least some of the following steps:

Removing the supplied antenna from the antenna base of the wireless phone.

Modifying if necessary the antenna base to accommodate the shielded RF adapter 12.

Positioning the printed circuit board RF clip if necessary to contact with the center conductor extension 16 of the shielded RF adapter 12.

Applying a conductive coating onto the phone casing where necessary, especially around the unshielded portion of the phone casing around the RF clip to increase shielding effectiveness.

Installing the shielded RF adapter 12 into the antenna base such that the contact extension 16 contacts the RF clip of the wireless phone.

The plumbing system described above includes certain embodiments of the plumbing system according to the principles of the present invention. Alternative plumbing systems can be used and are encompassed by the principles of the present invention for converting or modifying wireless phones that radiate stray RF energy into wireless phones where the RF energy is confined to a shielded transmission path. With particular reference to FIG. 3 and FIG. 4, a particular embodiment of the plumbing system according to the principles of the present invention modifies a wireless phone 30 of FIG. 3 and yields the wireless phone 30' of FIG. 4. In this particular embodiment, the wireless phone 30 is modified according to the following steps:

1. Remove the antenna 31 supplied with the phone 30 by unscrewing the mounting plug 32.

2. Remove the battery cover (not shown) and battery (not shown) from the battery compartment 33 in the back casing 34 of the phone 30.

3. Remove the back casing 34 of the phone 30. In this particular embodiment, remove the fasteners (not shown) that secure the back casing 34 to the front casing 36. Then separate the back casing 34 from the front casing 36.

4. Locate the antenna guide tube 38 that is positioned inside the back casing 34 below an antenna mounting base 40 and that may protrude into the battery compartment 33. Remove the guide tube 38.

5. Place the back casing 34 (battery compartment 33 downward) on a firm surface (not shown) covered with a thin padding material (not shown) to protect the plastic back casing 34. Hold the back casing 34 over a phone component cavity 44 of the back casing 34 to support it during the next several steps. Care should be taken to prevent bending any power contacts (not shown) or other components (not shown) on the inside of the back casing 34.

6. Remove the threads of the antenna mounting base 40 if necessary with a specially modified twist drill (7/32 modified flute) for brass material. Use the drill at a very slow speed (for example, under 100 RPM) to provide better control during the process. Remove all loose metal chips.

7. Thread the antenna mounting base 40 with a 1/4-36 tap and remove all loose metal chips during the operation. Chip removal is extremely important since this can effect the tap removal process.

8. Apply a conductive coating 48 to provide shielding of the inside corner 50 of the phone back casing 34. In this particular embodiment, the area 50 inside the back casing 34 around the RF clip 54/antenna mounting base 40 is typically not coated with shielding material. The conductive coating can be made of a variety of conductive materials such as a pure silver coating. The coating 48 should extend onto and slightly inside the threaded antenna mounting base 40. Allow the coating to thoroughly dry.

9. Locate the small metal antenna RF clip 54 (in this particular example, a tin plated clip 54 folded over in a "U" configuration with a "Y" end) attached to the corner of the printed circuit board 56 of the phone 30 that is near the antenna base 40 when the front and back casings 34 and 36 are mated.

10. Bend the upper half of the RF clip 54 slightly more than a forty-five degree angle (or as needed) from its original position by placing a small needle nose pliers or the like at the upper half near the base of the "U" shaped clip 54 in this particular embodiment. The intent is to position the "Y" end of the clip 54 so that the center contact extension pin 16 of the shielded RF adapter 12 makes direct yet unattached contact with the end of the RF clip 54 when the adapter 12 is threaded into the antenna mounting base 40. In this particular embodiment, there should be about a tenth of an inch clearance between the RF clip 54 and the shielded metal housing 58 surrounding the printed circuit board 56 (required clearance to spring load the contacts). In other embodiments, RF clips may have to be modified or replaced such that the RF clip 54 makes contact with the center contact extension pin 16 of the RF coax adapter 12. This additional procedure is dealt with on a case by case basis.

11. Carefully reassemble the back casing 34 to the front casing 36.

12. Replace the fasteners (not shown) of this particular example and torque to an appropriate value.

13. Reinstall the battery (not shown) and battery cover (not shown).

14. Install the RF adapter assembly which in this particular embodiment includes the shielded RF adapter 12 having the center pin extension 16, the jam nut 22 and a lock washer (not shown) if necessary into the threaded antenna mounting base 40 and torque to 2 inch-pounds.

15. The wireless phone 30 is now "plumbed" and ready for performing a variety of tests and measurements which require the RF energy from the phone to be confined to the shielded RF transmission path.

Figure 2:
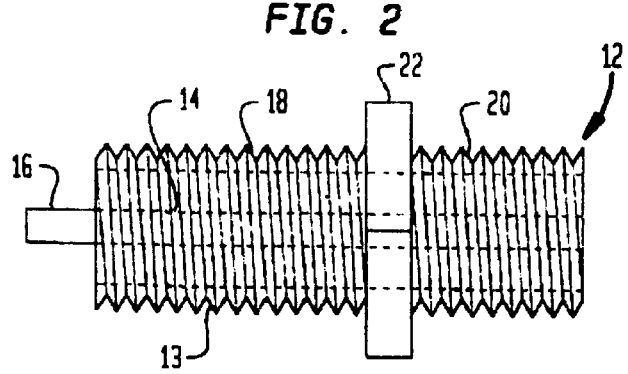
FIG. 2 shows a side view of the enhanced shielded RF adapter according to certain principles of the present invention.

Initial testing of the wireless phones using the plumbing system with the shielded RF adapter 12 indicates equal to or slightly improved RF transmission performance over the previous SMB connector configuration (FIG. 1). Time Domain Reflectometer (TDR) measurements performed on both SMB connector configuration-equipped phones and shielded RF adapter 12-equipped phones according to the enhanced plumbing system to evaluate the impedance mismatches show that the wireless phones with the SMA coax adapter 12 provide a better match to a 50 ohm transmission line with the least amount of impedance discontinuities. The phones using the SMB connector configuration (FIG. 1) and the shielded RF adapter 12 according to the present plumbing system demonstrated equal RF transmission performances when evaluated in an RF shielded enclosure under actual operating conditions.

Additionally, the occurrence of broken SMB connectors 3 (FIG. 1) on the plumbed phones due to bending forces created by the coax cable that couples the phones 2 to the test sets has been eliminated by the added strength of the shielded RF adapter 12. RF shielding effectiveness of the silver coated phones indicates that the received signal shielding has been increased by approximately 25 dB for certain wireless phones.

Thus, the plumbing system according to the principles of the present invention for wireless phones reduces stray radiation and enables certain optimization measurements and tests to be performed at a lower cost and equal if not better performance than wireless phones modified according to other systems. In certain embodiments, the plumbing system accomplishes this by converting the wireless phones using a shielded RF adapter according to certain aspects of the present invention. Alternative configurations of the plumbing system are possible which add or omit steps and/or perform variations of the above-described system.

Other alternative embodiments can be used which are encompassed by the principles of the present invention to provide a wireless phone which confines the emitted RF energy to a shielded transmission path. Depending on the type of wireless phone and the application, variations of the plumbing process and alternative shielded RF adapters are possible. For example, the contact between the RF output from the printed circuit board and the shielded RF adapter can be a direct contact or a contact through a conductor without a pinched fold-over site. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of modifying a wireless phone, said method comprising the steps of:

removing an antenna from an antenna base of the wireless phone;

physically modifying the antenna base to accommodate a shielded RF adapter including forming threads on or in the antenna base;

installing the shielded RF adapter into the antenna base; and contacting the shielded RF adapter with an RF output of the wireless phone.

2. The method of claim 1, wherein said step of physically modifying further includes the step of:

removing existing threads of the antenna base prior to forming threads on or in the antenna base.

3. The method of claim 2, wherein said step of forming threads further includes the step of:

using a ¼ inch diameter, 26 threads per inch, tap.

4. The method of claim 2, wherein said step of removing further includes the step of:

using a twist drill bit having a 7/32 inch diameter modified flute for brass material.

5. The method of claim 1, wherein said step of contacting further includes the step of:

contacting directly a contact extension of the shielded RF adapter with an RF clip of the RF output of the wireless phone.

6. The method of claim 5, wherein said step of contacting further includes the step of:

positioning the RF clip to make contact with the contact extension of the shielded RF adapter.

7. The method of claim 6, wherein said step of positioning includes the step of:

bending the RF clip.

8. The method of claim 1, further including the step of:

applying a conductive coating to any unshielded portion of a casing of the wireless phone around the antenna base to increase shielding effectiveness.

9. The method of claim 1, wherein said step of installing includes:

providing an SMA-type RF coaxial bulkhead connector to serve as the shielded RF adapter.

10. The method of claim 9, further including the step of modifying the SMA-type RF coaxial bulkhead connector prior to said step of installing.

11. The method of claim 10, wherein said step of modifying includes removing a portion of the SMA-type RF coaxial bulkhead connector to form an extended center conductor pin at one end of the SMA-type RF coaxial bulkhead connector.

\* \* \* \* \*